United States Patent Office 3,444,223
Patented May 13, 1969

3,444,223
PRODUCTION OF ORGANOLEAD COMPOUNDS
Richard D. Gorsich, Baton Rouge, La., assignor to Ethyl Corporation, New York, N.Y., a corporation of Virginia
No Drawing. Continuation-in-part of applications Ser. No. 408,388, Ser. No. 408,400, and Ser. No. 408,401, Nov. 2, 1964. This application May 20, 1968, Ser. No. 730,619
Int. Cl. C07f 7/24, 7/26; C07b 17/00
U.S. Cl. 260—437                                31 Claims

ABSTRACT OF THE DISCLOSURE

Process for the production of an organolead compound having at least one radical selected from the group consisting of aryl, vinylic and alkyl radicals attached directly to the lead by first combining, as a liquid composition, at least one compound selected from the group consisting of aryl magnesium halides, vinylic magnesium halides, and alkyl magnesium halides with a hydrocarbon halide in a cyclic monoether and then in a second step adding a lead salt to the composition. In another embodiment of the invention a tetravalent lead compound having at least one vinylic group attached to the lead is produced by reacting a vinylic magnesium chloride, lead chloride and an alkyl chloride in the presence of a defined cyclic monoether.

CROSS REFERENCES TO RELATED APPLICATIONS

This application is a continuation-in-part of application Ser. No. 408,388, filed Nov. 2, 1964, now abandoned, application Ser. No. 408,400, filed Nov. 2, 1964, now abandoned, and application Ser. No. 408,401, filed Nov. 2, 1964, now abandoned.

BACKGROUND OF THE INVENTION

Chemical processes for the production of tetravalent lead compounds having carbon to lead linkages have long been the subject of much investigation; however, all these processes appear to have the disadvantages of low yield of the desired organometallic compound and the attending production of free lead which is both difficult and expensive to recover. The preparation of tetraalkyl lead compounds is disclosed in U.S. Patent 2,535,193, patented Dec. 26, 1950, wherein the reaction of lead, an alkyl Grignard reagent and an alkyl halide is taught to produce tetraalkyl lead compounds. The production of free lead, which must be recovered for economic reasons, attends this reaction.

The preparation of vinyl lead compounds has been disclosed in Patent 3,071,607, patented Jan. 1, 1963, and in U.S. Patent 3,148,959, patented Sept. 15, 1964. According to these patents vinyl lead compounds may be produced by reacting a vinyl Grignard reagent with lead chloride. The processes, as disclosed in these patents and as well as others known in the art, all have certain disadvantages. In these processes there is a relatively low yield of the desired tetravalent lead product and the processes produce free lead along with the desired product. The free lead produced will not react with additional quantities of alkyl or vinyl Grignard reagent, and thus it must be recovered and purified as a valuable by-product, and if to be reused in the processes must be converted to lead chloride.

It is therefore an object of this invention to provide an improved chemical process for the production of a tetravalent lead compound having at least an aryl, vinylic or alkyl radical, or mixtures of these, attached to the lead. It is also an object of this invention to produce directly organolead compositions which are suitable for improved antiknock compositions. Other objects of the invention are to produce an organolead compound having both vinylic and alkyl radicals attached directly to the lead, having only alkyl groups attached directly to the lead, having at least one aromatic ring attached directly to the lead or mixtures of these organolead compounds; and it is a further object to produce these organolead compounds at higher yields and efficiencies. Other objects of this invention are to produce alkyltrivinylic lead compounds in high yields, as well as mixtures of alkyltrivinylic and tetravinylic lead compounds. Also, it is an object of this invention to produce tetraalkyl lead compounds having the same or different alkyl groups attached to the lead. It is a further object to produce organolead compounds having three aromatic rings attached directly to the lead.

SUMMARY OF THE INVENTION

According to this invention tetravalent lead compounds having alkyl groups attached to the lead may be produced at high yields by combining in a first step an alkyl Grignard reagent with an organic halide, and in a second step reacting the product of the first step with a lead salt. Tetravalent lead compounds having vinylic groups attached to the lead may be produced at high yields by combining in a first step a vinylic Grignard reagent with an organic halide and in a second step reacting the product of the first step with a lead salt. Tetravalent lead compounds having at least one aromatic group attached to the lead may be produced at high yields and selectivities by combining in a first step an aromatic Grignard reagent with an organic halied and in a second step reacting product of the first step with a lead salt. Preferably, both steps of all the reactions will be conducted in the presence of a cyclic ether.

According to another embodiment of this invention, tetravalent lead compounds having vinylic groups attached to the lead may be produced at high yields by reacting a cyclic ether, a vinylic Grignard reagent, lead halide and an alkyl halide. In this embodement there are several essential and critical features of the invention. The reaction must be conducted in the presence of a cyclic ether. As stated, the invention comprises the reaction of a vinylic Grignard reagent, lead halide and an alkyl halide, and a critical feature of this invention is that an alkyl halide must be employed. For this embodiment of the invention, the orgnic halide must be an alkyl halide rather than a vinyl or other halide, and especially preferred reactants are vinylic magnesium chloride, lead chloride and alkyl chloride. One of the advantages of this embodiment of the invention, as well as the embodiment of the two-step process, is that desired alkyltrivinylic lead compounds are produced in high yields. Such compositions have been found to be an advantage as an antiknock composition in gasoline.

Another advantage of this invention is that alkyltrivinylic lead compounds mixed with vinylic lead compounds are produced in high yields. These products have particular utility as antiknock compounds and moreover can be combined or redistributed with other alkyl-vinylic lead isomers to produce enhanced antiknock agents. According to one embodiment of the present invention, it has been found, surprisingly, that in the two-step process wherein a product of a vinylic Grignard reagent, an alkyl Grignard reagent or an aryl Grignard reagent is employed and mixed with an alkyl halide and the resulting product is reacted with a lead salt, much higher yields of alkyl, vinylic or aryl lead compounds are produced. Furthermore, the vinylic lead compounds produced in this fashion contain a high ratio of vinylic to alkyl groups and the desirable alkyltrivinylic lead compounds are selectively produced at high yields.

A preferred feature of this invention is a process for the production of desired alkyl-vinylic lead compounds directly from magnesium, vinyl halide and lead halide and an alkyl halide. By such a process magnesium and vinyl halide are reacted in a solution of cyclic ether and if desired, any excess vinyl halide may then be vented. Thereafter the lead salt and alkyl halide are added to the solution. Upon reaction the desired alkylvinylic lead compounds are obtained in high yields.

The process of this invention may be more completely understood and illustrated by the following examples. All parts are by weight unless expressed otherwise.

Example I

Ethyl magnesium chloride was prepared from 8.0 g. (0.33 m.) of magnesium metal and an equivalent amount of ethyl chloride in 150 ml. of tetrahydrofuran. The Grignard was cooled to 5° C. in an ice bath and 5.1 g. (0.1 m.) of methyl chloride was condensed into the flask. Anhydrous lead acetate in an amount of 32.7 g. (0.1 m.) was added to the rapidly stirred solution over a 15 minute period. After stirring at 5° C. for 30 minutes the solution was slowly warmed to 55° C. and stirred for 30 minutes.

The reaction mixture was cooled and hydrolyzed with aqueous ammonium chloride and the organic layer containing the organolead product was separated. The organic phase yielded on distillation 28.7 g. (89% yield) of triethylmethyl lead.

Example II

Ethyl magnesium chloride was prepared from 8.0 g. (0.33 m.) of magnesium metal and an equivalent amount of ethyl chloride in 125 ml. of tetrahydrofuran as solvent. Into this solution was condensed approximately 10 ml. (0.16 m.) of ethyl chloride. The mixture was cooled to 5° C. and 32.7 g. (0.1 m.) of anhydrous lead acetate was added over a 15 minute period. The solution was slowly warmed to ambient temperature and stirred for 30 minutes.

The reaction mixture was hydrolyzed with aqueous ammonium chloride and the organic phase containing the organolead product was separated. The tetrahydrofuran was removed by distillation and 27.1 g. (87% yield) of tetraethyl lead was obtained.

Example III

Methyl magnesium chloride was prepared from 4.0 g. (0.16 m.) of magnesium turnings and 8.3 g. (0.16 m.) of methyl chloride in 150 ml. of tetrahydrofuran as solvent. The Grignard solution was cooled to 5° C. and 20 ml. (excess) of methyl chloride was condensed into the solution. Lead chloride in an amount of 13.9 g. (0.05 m.) was added to the mixture over a 30 minute period.

The solution was slowly warmed to ambient temperature and hydrolyzed with aqueous ammonium chloride to remove any excess Grignard reagent. The organic layer containing the organolead product was separated and diluted in a volumetric flask. Analysis showed that 12.32 g. (93% yield) of tetramethyllead was produced.

Example IV

Vinyl magnesium chloride was prepared by the reaction of magnesium and vinyl chloride at 55–60° C. Magnesium chips, 25 g., were reacted in tetrahydrofuran with an excess of vinyl chloride. The reaction was initiated with .5 ml. of ethylene dibromide. The reaction product was cooled and unreacted vinyl chloride was distilled off. The product solution was filtered to remove a small amount of unreacted magnesium. Aliquots of this product solution indicated it was 1.89 molar, as evidenced by the usual acid titration method for Grignards.

Lead chloride, 13.9 g., was added to a stirred solution consisting of 83 ml. of vinyl magnesium chloride (150 mmols) and 50 ml. of tetrahydrofuran during 12 min. at 5° C. The mixture was stirred at ambient temperature for 54 minutes. No Pb metal formed. Subsequently 7.2 g. of methyl chloride was added. No reaction occurred at ambient temperature. The mixture was heated to 50° C. during 10 minutes to cause complete reaction. The mixture was hydrolyzed at 10° with 8.0 g. of $NH_4Cl$ in 60 ml. of water. The product was steam distilled and then extracted with hexane. Analysis by the dithizone method showed the organic solution to contain 6.4 g. (61.7% yield based on $PbCl_2$) of Pb as $R_4Pb$. VPC analysis showed the product to consist of 56.3 wt. percent trivinylmethyl lead and 43.6 wt. percent tetravinyl lead. The lead in the steam distillation pot was filtered and dried.

Example V

The general procedure of Example IV was repeated. Lead chloride, 40 mmols, was added to 126 mmols of vinyl magnesium chloride and 50 ml. of tetrahydrofuran. Thereafter, 280 mmols of methyl chloride was added and the reaction conducted at reflux temperature. The yield of tetravalent lead compounds was 59.3 wt. percent based on the lead chloride. The reaction product contained 53.3 wt. percent trivinylmethyl lead and 33.8% tetravinyl lead.

Example VI

Example IV was repeated with the exceptions that 40 mmols of lead chloride, 126 mmols of vinyl magnesium chloride and 140 mmols of methyl chloride were used. The product contained 60.6 wt. percent trivinylmethyl lead.

Example VII

Tetravalent lead compounds were produced by adding 135 mmols of vinyl magnesium chloride in terahydrofuran to a preformed composition of 40 mmols of lead chloride and 156 mmols of methyl chloride. The yield of tetravalent lead compounds was 64.4 wt. percent based on the lead chloride. The product contained 57.1 wt. percent trivinylmethyl lead and 42.3 wt. percent tetravinyl lead.

Example VIII

Example IV is repeated with the exception that tetrahydropyran is substituted for the tetrahydrofuran, 150 mmols 1-propenyl magnesium chloride is substituted for the vinyl magnesium chloride, and isobutyl chloride is substituted for the methyl chloride. A high yield of tri 1-propenylisobutyl lead is obtained.

Example IX

Vinyl magnesium chloride was prepared by the reaction of magnesium and vinyl chloride at 55–60° C. Magnesium chips, 25 g., were reacted in tetrahydrofuran with an excess of vinyl chloride. The reaction was initiated with 0.5 ml. of ethylene dibromide. The reaction product was cooled and unreacted vinyl chloride was distilled off. The product solution was filtered to remove a small amount of unreacted magnesium. Aliquots of this product solution indicated it was 1.89 molar, as evidenced by the usual acid titration method for Grignards.

A dry, 500-ml., 4-necked flask was charged with 107 ml. (200 mmoles) of vinyl magnesium chloride and 50 ml. of tetrahydrofuran (distilled from $NaAlH_4$) in an inert atmosphere. The reaction vessel was then fitted with a high speed stirrer, a thermometer, and a Dry Ice-isopropanol condenser. The system was assembled under a nitrogen atmosphere and a slight positive nitrogen pressure was maintained throughout the course of the reaction. After charging the condenser with Dry Ice-isopropanol, 7.8 g. of refrigerant grade methyl chloride was condensed into the reaction mixture while stirring and while cooling the mixture at 5° C.

A dry, 50 ml. flask was charged with 13.9 g. (50 mmols) of lead chloride in an inert atmosphere. The vessel containing the lead chloride was connected with rubber tubing to the 500 ml. flask containing the vinyl magnesium chloride-methyl chloride-tetrahydrofuran product. Subsequently, the $PbCl_2$ was added to the 500 ml. flask in small portions during a period of 14 minutes while stirring rapidly. The reaction temperature was maintained at +3 to +5° C. during the addition by external cooling. The PbCl$_2$ addition flask was rinsed with 20 ml. of tetrahydrofuran. After the addition was complete, the reaction mixture was stirred at 5° C. for 15 min. and at 25° C., for 15 min. The reaction mixture was then cooled to 10° C. and was slowly hydrolyzed with 10.5 g. of ammonium chloride in 75 ml. of water. The product was steam distilled. The distillate was diluted with water until the organic layer settled to the bottom. This was decanted and extracted with hexane which was separated and combined with the organic layer. A small amount of water was separated. Analysis of the organic layer by the dithizone method for organic lead showed the solution to contain 10.36 g. (100% yield based on PbCl$_2$) of Pb as R$_4$Pb. Analysis of the product by vapor phase chromatography showed it to consist of 98.9 wt. percent trivinylmethyl lead and 1.1 wt. percent dimethyldivinyl lead.

Example X

Lead chloride, 13.9 g., was added as described in Example IX to 78 ml. of a tetrahydrofuran solution containing 150 mmols of vinyl magnesium chloride, 50 ml. of tetrahydrofuran and 7.8 g. of methyl chloride during 21 minutes at 25° C. The Grignard concentration was determined by hydrolysis of the Grignard and measurement of the ethylene evolved. The mixture was stirred at 25° C. for 15 minutes and then was worked up as described in Example IX. The yield of trivinylmethyl lead was 92.5%. The product consisted of 97.6 wt. percent trivinylmethyl lead and 2.4 wt. percent divinyldimethyl lead.

Example XI

Lead chloride, 9.8 g., was added to a stirred solution consisting of 63 ml. of 1.83 N vinyl magnesium chloride in tetrahydrofuran, 7.6 g. of methyl chloride and 50 ml. of diethyl ether at 5° C. during 10 minutes. The lead chloride addition flask was rinsed with 20 ml. of diethyl ether. The mixture was stirred at 5° C. for 15 minutes and 25° C. for 15 minutes. Workup of the mixture by steam distillation gave a tetraorganolead composition consisting of 98.8% trivinylmethyl lead and 1.2 wt. percent divinyldimethyl lead. When the lead chloride addition was made at 25° C. the product consisted of 90.7% trivinylmethyl lead and 9.3% divinyldimethyl lead.

Example XII

Lead chloride, 11.1 g., was added to 122 ml. of tetrahydrofuran containing 120 mmols of vinyl magnesium chloride and 7.3 g. of ethyl chloride at 25° C. during a period of 10 minutes. The mixture was heated to 50° C. to complete the reaction. Workup as described in previous examples afforded ethylvinyl lead compounds.

Example XIII

Vinyl magnesium chloride, 130 mmols, in 140 ml. of tetrahydrofuran is combined with 60 mmols of n-butyl chloride with stirring. Thereafter 40 mmols of lead chloride is added to the reaction flask while maintaining the reaction temperature at 25° C. A high yield of tetraorganolead compounds having both n-butyl and vinyl groups attached to the lead is obtained.

Example XIV

Vinyl magnesium bromide, 90 mmols, in 50 ml. of tetrahydrofuran and 50 ml. of dioxane is combined with 30 mmols of n-propyl chloride. Thereafter 30 mmols of lead dichloride is added to the reaction flask over a period of 60 minutes while maintaining the reaction temperature at 0° C. A high yield of tetraorganolead compounds having both n-propyl and vinyl groups attached to the lead is obtained.

Example XV 1-propenyl magnesium chloride, 160 mmols, in 150 ml. of tetrahydropyran is combined with 90 mmols of methyl chloride at about 25° C. In a second step 50 mmols of lead dibromide is added to the reaction flask over a period time of 30 minutes while maintaining the reaction flask at a temperature of 60° C. The product is a combination of tetraorganolead compounds containing a high ratio of methyltri-1-propenyl lead.

Example XVI 2-methyl-1-butenyl magnesium chloride, 140 mmols, in a solvent mixture of 50 ml. of benzene and 100 ml. of tetrahydrofuran is combined with 35 mmols ethyl iodide and the combination reacted with 25 mmols of lead acetate. A good yield of tetraorganolead compounds is produced.

Example XVII

Vinyl magnesium chloride, 70 mmols, in a solvent comprising 25 ml. of the dimethyl ether of diethylene glycol, 25 ml. of methylal and 75 ml. of tetrahydrofuran is combined with 30 mmols of methyl chloride at about 25° C. During a period of about 25 minutes, 30 mmols of lead naphthenate is added to the reaction mixture while maintaining the reaction mixture at a temperature of 5° C. A good yield of tetraorganolead compounds is produced.

Example XVIII

Phenyl magnesium chloride was prepared by slowly adding 56 g. of chlorobenzene in 260 ml. of dry tetrahydrofuran to 15 g. of magnesium turnings. The reaction was initiated with .5 ml. of ethylene bromide. The mixture was kept at 63–65° C. during the reaction by means of external heating. Excess magnesium was filtered off. Standard acid titration of the Grignard indicated the solution to be 1.36 N.

A dry, 500-ml. 4-necked flask was charged with 97 ml. of the resultant tetrahydrofuran solution of phenyl magnesium chloride in an inert atmosphere. The reaction vessel was then fitted with a high speed stirrer, a thermometer, and a Dry Ice-isopropanol condenser. The system was assembled under a nitrogen atmosphere and a slight positive nitrogen pressure was maintained throughout the course of the reaction. After charging the condenser with Dry-Ice-isopropanol, 7.7 g. of refrigerant grade methyl chloride was condensed into the reaction mixture while stirring and cooling.

A dry, 50 ml. flask was charged with 11.1 g. of lead chloride in an inert atmosphere. The vessel containing the lead chloride was connected with rubber tubing to the 500 ml. flask containing the phenyl magnesium chloride-methyl chloride-tetrahydrofuran composition. Subsequently, the PbCl$_2$ was added to the 500 ml. flask in small portions during a period of 13 minutes while rapidly stirring. The reaction temperature was maintained at 25° C. during the addition by external cooling. After the addition was complete, the reaction mixture was stirred at ambient temperature for one hour. The reaction mixture was then cooled at 10° C. and was slowly hydrolyzed with 6.9 g. of ammonium chloride in 75 ml. of water. The organic solution was flooded with water until the organic layer settled to the bottom. The product was extracted with heptane and lead was determined by the dithizone method. Analysis of the organic layer showed the solution to contain 7.92 g. (95.7% yield based on PbCl$_2$) of Pb as triphenylmethyl lead. The product was isolated as a crystalline solid after evaporation of the solvent.

Example XIX

A high yield of triphenylmethyl lead was produced by repeating Example XVIII with the exceptions that phenyl magnesium bromide was substituted for the phenyl magnesium chloride and the solvent used was a 50:50 volume mixture of tetrahydrofuran and ethyl ether.

Example XX

Ortho-tolyl magnesium chloride, 120 mmols, in 130 ml. of tetrahydrofuran is combined with 65 mmols of n-butyl chloride with stirring. Thereafter 40 mmols of lead dichloride is added to the reaction flask while maintaining the reaction temperature at 25° C. A high yield of tetraorganolead compounds having both n-butyl and ortho-tolyl groups attached to the lead is obtained.

Example XXI

Phenyl magnesium bromide, 100 mmols, in 50 ml. of tetrahydrofuran and 50 ml. of meta-dioxane is combined with 35 mmols of n-propyl chloride. Thereafter 30 mmols of lead dichloride is added to the reaction flask over a period of 60 minutes while maintaining the reaction temperature at 0° C. A high yield of tetraorganolead compounds having both phenyl and n-propyl groups attached to the lead is obtained.

Example XXII

Phenyl magnesium chloride, 125 mmols, in 150 ml. of tetra-hydropyran is combined with 75 mmols of methyl chloride at about 25° C. Thereafter 45 mmols of lead dibromide is added to the reaction flask over a period of time of 25 minutes while maintaining the reaction flask at a temperature of 25° C. The product is a combination of tetraorganolead compounds.

Example XXIII

Phenyl magnesium chloride, 70 mmols, in a solvent comprising 25 ml. of the dimethyl ether of the diethylene glycol, 25 ml. of dimethyl ether and 75 ml. of tetrahydrofuran is combined with 30 mmols of methyl chloride at about 25° C. During a period of about 30 minutes, 30 mmols of lead naphthenate is added to the reaction mixture while maintaining the reaction mixture at a temperature of 5° C. The product is a combination of tetraorganolead compounds.

In accordance with one embodiment of the invention the lead compositions produced by the process of the invention comprise, in general, organolead compounds having alkyl groups attached directly to the lead. The alkyl radicals may contain from 1 to 12 carbon atoms with alkyl radicals having from 1 to 8 carbon atoms being particularly preferred. Especially preferred are the alkyl radicals of 1 or 2 carbon atoms. The alkyl radicals may be the same or different and examples of compounds that may be produced in accordance with this invention are tetramethyllead, tetraethyllead, methyltriethyllead, dimethyldiethyllead, trimethylethyllead, and other similar tetraalkyl lead compounds wherein one or more of the alkyl radicals have additional carbon atoms.

The lead compositions produced in accordance with another embodiment of the invention comprise, in general, organolead compounds having vinylic groups attached directly to the lead and any remaining valences of the lead satisfied by organo radicals, preferaly alkyl. Generally the alkyl radicals will contain from 1 to 8 carbon atoms with the alkyl radicals having 1 or 2 carbon atoms being particularly preferred. The alkyl groups may be the same or different. The vinylic groups may also be the same or different. Examples of compounds that may be produced in accordance with this embodiment of the invention are trimethylvinyl lead, dimethyldivinyl lead, methyltrivinyl lead, triethylvinyl lead, diethyldivinyl lead, ethyltrivinyl lead, methylethyldivinyl lead, methyldiethylvinyl lead, di-n-butyldivinyl lead, n-hexyltrivinyl lead, 2-ethylhexyltrivinyl lead, dimethylethylvinyl lead, dimethyldipropenyl lead, dimethyldibutenyl lead, methyltriisobutyl lead, isopropyltrivinyl lead, methyldivinylpropenyl lead and mixtures thereof and the like. However, as shown previously, the reaction is selective for the production of alkyltrivinyl lead compounds. Preferred organolead compositions in accordance with this embodiment are those containing as a major product alkyltrivinylic lead such as methyltrivinyl lead. Another preferred composition is that wherein the product contains as the major component a mixture of alkyltrivinylic lead compounds and tetravinylic lead such as an organolead product containing at least 50 mol percent of a combination of alkyltrivinylic lead and tetravinylic lead, with this combination more preferably being about 75 mol percent of the organolead product. These compositions possess the unique characteristics such as for antiknock compositions and it is an important feature of this invention that they may be produced directly.

In another embodiment of this invention the aromatic lead composition produced according to the present process comprise, in general, organolead compounds having an aromatic ring attached directly to the lead and any remaining valences of the lead are satisfied by hydrocarbon radicals, preferably alkyl. Generally the hydrocarbon radicals other than the aromatic radicals will contain from 1 to 12 carbon atoms with the hydrocarbon radicals having 1 to 8 carbon atoms being particularly preferred. Especially preferred are alkyl radicals of 1 to 2 carbon atoms. The hydrocarbon groups may be the same or different. The aromatic groups may also be the same or different. Examples of compounds that may be produced in accordance with this embodiment of the invention are trimethylphenyl lead, dimethyldiphenyl lead, methyltriphenyl lead, diethyldiphenyl lead, ethyltriphenyl lead, methylethyl-o-tolyl lead, methyldiethylphenyl lead, n-butyl-triphenyl lead, n-hexyltriphenyl lead, 2-ethyl-hexyltriphenyl lead, dimethylethylphenyl lead, tetraphenyl lead, isopropyltriphenyl lead, mixtures thereof and the like. As shown previously, however, the reaction of this embodiment is selective for the production of alkyl triaromatic lead compounds such as alkyltriphenyl lead compounds.

Preferred organolead compositions are those containing as a major product alkyltriphenyl lead such as methyltriphenyl lead. These compositions are valuable for antiknock compositions and it is an important feature of this invention that these compositions may be produced directly.

In the embodiments of the invention wherein the process is conducted in two steps, the reaction should be conducted preferably in the presence of a cyclic ether. Apparently the cyclic ether functions not only as a solvent but also as a catalyst, particularly in regard to the reaction of the organo halide such as the alkyl halide with the other components. Another function of the cyclic ether is to influence the distribution of the products. The cyclic ether further appears to function with the other reactants to increase the yield of alkyl lead compounds, vinylic lead compounds or aromatic lead compounds and to reduce the formation of by-product lead.

In the embodiment of the invention wherein a vinylic magnesium halide, lead salt and alkyl halide are reacted, it is a critical feature of the invention that the reaction must be conducted in the presence of a cyclic ether. Apparently the cyclic ether in this embodiment functions not only as a solvent but also as a catalyst, particularly in regard to the reaction of the alkyl halide with the other components. As before, another function of the cyclic ether is to influence the distribution of the products. The cyclic ether further appears to function with the other reactants to increase the yield of the vinylic lead compounds and to reduce the formation of by-product lead.

Suitable cyclic ethers are mono ethers such as those having the formula

wherein R is an unsubstituted alkylene radical, R′ is selected from the group consisting of an ethylene radical, an ethylenically unsaturated divalent hydrocarbon radical, >CHA and mixtures thereof; Z is selected from the group consisting of a methylene radical, >NA and mixtures thereof, and A is an aliphatic radical of from 1 to 10 carbon atoms. When Z is >NR, the ring will contain 6 members and Z and O will be 1,4 with respect to each other. The cyclic ethers will suitably contain up to 20 carbon atoms. Suitably there will be at least one hydrogen atom attached to each carbon atom in the ring. The cyclic ether may be substituted with radicals which will not react with the vinylic, alkyl or aryl Grignard reagent, the lead salt or the alkyl halide. Suitable substituents are alkyl radicals such as ethyl, aryl radicals such as phenyl, akoxy radicals such as methoxy, and aroxy radicals such as toloxy. The number of carbon atoms in the substituted radicals will be from 1 to 12, preferably from 1 to 8. Preferably the cyclic ethers will have from 5 to 6 atoms in the ring structure.

Suitable cyclic ethers are tetrahydrofuran, 3-ethyl tetrahydrofuran, 2-(o-toloxy)tetrahydrofuran, N-methyl morpholine, the methyl ether of tetrahydrofurfuryl alcohol, e-phenoxy-tetrahydrofuran, 4-ethoxytetrahydrofuran, 2,5-dihydrofuran, tetrahydropyran, 4-methoxytetrahydropyran, 2-ethoxy-3,4-dihydro-2H-pyran, mixtures thereof and the like.

The preferred cyclic ethers are tetrahydrofuran and tetrahydropyran with tetrahydrofuran being especially preferred. The oxygen of the cyclic ether must be free to form a complex with the vinylic, alkyl or aryl Grignard reagent, consequently, the cyclic ethers employed should not have groups in the ring which would block the formation of a complex between the ring oxygen and the Grignard reagent.

The cyclic ether should be present in an amount of at least one mol of cyclic ether per mol of vinylic, alkyl or aryl Grignard reagent and better results are generally obtained when the cyclic ether is present in an amount of greater than one mol per mol of Grignard reagent. The upper limit of the quantity of cyclic ether is not particularly critical but for economic reasons will not ordinarily exceed 5 mols of cyclic ether per mol of Grignard reagent. The desired ratio will be dependent somewhat on the amount of lead salt and alkyl halide present. A suitable range is from .20 to 4 mols of cyclic ether per mol of Grignard. The cyclic ether will, for best results, constitute at least 50 mol percent of the total solvent and diluent present during the reaction to form the desired lead compounds.

Other solvents may be added to the reaction; however, selection of the quantity and type of the solvent should be controlled in order that the reactants are not precipitated from solution. Suitable solvents, such as the hydrocarbons, are the aliphatic ethers such as ethyl ether, the diethyl ether of ethylene glycol, the dibutyl ether of ethylene glycol and the like, and cyclic diethers such as dioxane.

The lead salts are preferably lead halides such as lead dichloride, although less desirably lead dibromide and lead diiodide may be employed or even lead dihalides having different halogen atoms attached to the lead. Lead tetrachloride may be employed but generally will be converted to the dichloride during the reaction. Other suitable lead salts are lead acetate, lead naphthenate and those that are known to react with Grignard reagents, such as phenyl or alkyl Grignard reagents. Also mixtures of lead salts may be employed.

For the one embodiment of the invention in which the cyclic ether is required, the lead halide is preferably lead dichloride, although less desirably lead dibromide and lead diiodide may be employed or even lead dihalides having different halogen atoms attached to the lead. Lead tetrachloride may be employed but generally will be converted to the dichloride during the reaction. Also mixtures of lead dihalides may be employed.

By the term vinylic Grignard reagent (i.e. a vinylic magnesium halide) is meant 1-alkenyl compounds of the formula RR'C=CHMgX wherein R and R' are the same or different hydrocarbon radicals, hydrocarbonoxy radicals or hydrogen, such as those selected from the group consisting of hydrogen, alkyl, alkoxy, aryl, aralkyl, alkaryl, aroxy and mixtures thereof. The aryl radicals suitably contain a single benzene ring with the radicals being such as the phenoxy radical, phenyl radical and the mono, di, and tri aliphatic substituted phenyl or phenoxy radicals. The vinylic Grignard reagents will have from 2 to 20 carbon atoms. Examples of vinylic Grignard reagents are vinyl magnesium chloride, propenyl magnesium chloride, hexenyl magnesium chloride, 2-ethyl hexenyl magnesium chloride, vinyl magnesium bromide, 2-phenyl ethenyl magnesium chloride, 2-phenoxy ethenyl magnesium chloride, 2-tolyl ethenyl magnesium chloride, cyclohexene-1-yl-1 magnesium chloride, mixtures thereof and the like.

The vinylic Grignard reagent of the formula

$$R_2C=CHMgX$$

may be produced in conventional manner. The halogen of the Grignard reagent and generally the halogen of the alkyl halide will have an atomic weight of at least 35, that is, the halogen will be selected from the group consisting of chlorine, bromine, iodine and mixtures thereof. Chlorine is particularly preferred.

By the term aryl Grignard reagent (i.e. an aromatic magnesium halide) is meant compounds of the formula RMgX wherein R is an aryl hydrogen radical wherein an aromatic ring is attached to the magnesium. The aryl radicals preferably contain a single benzene ring with the radicals being such as the phenyl radical and the mono, di and tri aliphatic substituted phenyl radicals. The aliphatic substituents may be straight chain or branched. The aromatic Grignard reagents will have from 2 to 20 carbon atoms. Examples of aromatic Grignard reagents are phenyl magnesium chloride, o-tolyl magnesium chloride, o,p-methyl phenyl magnesium chloride, phenyl magnesium bromide, mixtures thereof and the like.

The aromatic Grignard reagent of the formula RMgX may be produced in conventional manner. The halogen of the Grignard reagent and generally the halogen of the hydrocarbon halide will have an atomic weight of at least 35, that is, the halogen will be selected from the group consisting of chlorine, bromine, iodine and mixtures thereof. Chlorine is particularly preferred because of the excellent results and overall economy.

The term alkyl Grignard reagent is meant to include compounds of the general formula RMgX wherein R is an alkyl radical having from 1 to about 20 carbon atoms. More preferred are alkyl radicals having from 1 to about 8 carbon atoms and especially preferred are those having 1 to 2 carbon atoms.

The hydrocarbon halide will be a compound of the formula RX wherein X is a halogen, preferably chlorine. Again less desirably, bromine and iodine may be used. The hydrocarbon radical may be normal or iso and will suitably have from 1 to 12 carbon atoms. Alkyl halides are preferred but cycloaliphatic halides may be employed. Alkyl radicals may be, for example, methyl, ethyl, propyl, isopropyl, n-butyl, isobutyl, 2-ethyl hexyl and the like. Examples of hydrocarbon halides are methyl chloride, methyl iodide, methyl bromide, ethyl chloride, n-propyl chloride, n-butyl chloride, isobutyl bromide, n-amyl chloride, n-octyl chloride, cyclohexyl chloride mixtures thereof and the like. Preferred alkyl halides are methyl chloride and ethyl chloride. Various combinations of the hydrocarbon halides may be used. For example, two or more hydrocarbon halides may be used simultaneously in the embodiment of the one stage process and mixtures of different hydrocarbon halides may be used in each stage of the two-stage embodiment. Therefore, one method for producing mixed lead compounds wherein the hydrocarbon groups are different is to utilize a combination of hydrocarbon halides, such as combination of methyl chloride and ethyl chloride. The combined methyl chloride and ethyl chloride may then be reacted with the Grignard reagent and the lead salt. The mixture of hydrocarbon halides may be present in any combination, and more than two hydrocarbon halides may also be employed.

The ratio of the total hydrocarbon halide to the total lead salt may be varied somewhat but generally will be in the ratio of about 0.5 to 10 mols of hydrocarbon halide per mol of lead salt. A preferred ratio of hydrocarbon halide to lead salt is between 1 and 4 mols of hydrocarbon halide per mol of lead salt. The ratio of the mol of Grignard reagent per mol of lead salt will normally be within the range of 2 to 10 but preferably will be present from 3 to 5 mols of Grignard reagent per mol of lead salt. The best overall results have been obtained at a ratio of about 3 mols of Grignard reagent and about one mol of hydrocarbon halide per mol of lead salt.

In the first step of the embodiment of the two step process, the vinylic, aryl or alkyl Grignard reagent, or mixtures thereof, is combined with the hydrocarbon halide. The exact mechanism of the overall reaction is not understood, but, according to this embodiment, the Grignard reagent or the mixture of Grignard reagents and the hydrocarbon halide must be combined prior to the reaction with the lead salt. The Grignard reagent and the hydrocarbon halide may be added together, at once or gradually mixed. Thereafter the lead salt may be added at one time or in increments.

The reactor employed may be of conventional design. Commercial reactors used for the preparation of tetraalkyllead by the reaction of sodium-lead alloys with an alkyl halide are satisfactory. The reactor should, of course, be suitable for operating under the pressure generated by the particular reactants at the temperature of reaction.

The temperature of reaction in any of the steps in any of the embodiments of the invention is not critical. It should be sufficiently high to give reasonable reaction rates but should not be above the decomposition temperature of the organometallic reactants or the organolead product. Thus, the operating temperature of the reaction depends upon the particular organometallic compounds involved. In general, suitable temperatures are between about −20° C. and about 150° C., but temperatures from about 0 to 50° C. are preferred to facilitate heat removal and for best results. Higher temperatures can be employed when using organolead thermal stabilizers. In some instances consdierable exothermic heat is generated and consequently a cooling medium may be desirable to control the temperature.

About atmospheric pressure is normally employed for both reactions, although subatmospheric pressures are permissible. In some instances, superatmospheric pressure is preferred, particularly when employing a relatively high temperature and a relatively volatile solvent. Also, a pressure of inert gas such as nitrogen is sometimes desirable, for example, to assure anhydrous conditions. The pressure will generally be from about 1 to 10 atmospheres with the range of about atmospheric (STP) to 75 p.s.i.g. being generally suitable.

The products of this invention possess considerable utility. These compositions are soluble in hydrocarbons and are valuable as antiknock compositions for gasolines. The composition containing the distributed species are of particular value. As has been shown, these compositions may be produced directly by the process of this invention.

Other embodiments of this invention can be made without departing from the spirit and scope of this invention which is not limited to the specific embodiments given herein.

What is claimed is:

1. A process for the production of an organolead compound having at least one radical selected from the group consisting of alkyl, aryl and vinylic radicals attached directly to the lead and the remaining lead valences satisfied by hydrocarbon radicals comprising, in combination, in a first step combining a liquid composition of a reactant compound, about 1 mol of hydrocarbon halide per 3 mols of said reactant compound and at least 1 mol of cyclic monoether per mol of said reactant compound to form a reaction product and then in a second step reacting said reaction production with a lead salt; said reactant compound being at least one represented by the formula RMgX wherein X is a halogen selected from the group consisting of chlorine, bromine and iodine and R is at least one monovalent radical selected from the group consisting of aryl hydrocarbon radicals having an aromatic ring attached directly to the magnesium, alkyl radicals having from 1 to about 12 carbon atoms and monovalent radicals represented by the formula $$R'R''C=CH-$$

wherein R′ and R″ each are at least one monovalent radical selected from the group consisting of alkyl, alkoxy, aryl, aralkyl, alkaryl, aroxy and hydrogen; said hydrocarbon halide being at least one compound represented by the formula YX′ wherein Y is at least one hydrocarbon radical selected from the group consisting of alkyl radicals having from 1 to 12 carbon atoms and cycloaliphatic radicals and X′ is a halogen selected from the group consisting of chlorine, bromine and iodine; said cyclic monoether being at least one ether represented by the formula

and mixtures thereof wherein $R_1$ is an alkylene radical, $R_2$ is selected from the group consisting of an ethylene radical, an ethylenically unsaturated divalent hydrocarbon radical and >CHA, Z is selected from the group consisting of a methylene radical and >NA, and A is an aliphatic radical; and said lead salt being at least one selected from the group consisting of lead halides, lead naphthanate, lead acetate, lead salts known to react with Grignard reagents, and mixtures thereof.

2. The process of claim 1 further characterized by said organolead compound having four alkyl radicals attached directly to the lead.

3. The process of claim 2 further characterized by at least one of said four alkyl radicals being different from the other alkyl radicals.

4. The process of claim 1 further characterized by said organolead compound being triethylmethyllead, said reactant compound being ethylmagnesium chloride and said hydrocarbon halide being methyl chloride.

5. A process for the production of an organolead compound having at least one vinylic radical attached directly to the lead and the remaining lead valences satisfied by hydrocarbon radicals comprising, in combination, in a first step combining a liquid composition of a reactant compound, about 1 mol of hydrocarbon halide per 3 mols of said reactant compound and at least 1 mol of cyclic monoether per mol of said reactant compound to form a reaction product and then in a second step reacting said reaction product with a lead salt; said reactant compound being at least one represented by the formula $$RR'C=CHMgX,$$

wherein R and R′ each are at least one monovalent radical selected from the group consisting of alkyl, alkoxy, aryl, aralkyl, alkaryl, aroxy and hydrogen and X is a halogen selected from the group consisting of chlorine, bromine and iodine; said hydrocarbon halide being at least one compound represented by the formula R″X′, wherein R″ is at least one hydrocarbon radical selected from the group consisting of an alkyl radical having from 1 to 12 carbon atoms and cycloaliphatic radicals and X′ is a halogen selected from the group consisting of chlorine, bromine and iodine; said cyclic monoether being at least one ether represented by the formula

wherein $R_1$ is an alkylene radical, $R_2$ is selected from the group consisting of an ethylene radical, and ethylenically unsaturated divalent hydrocarbon radical, >CHA; Z is selected from the group consisting of a methylene radical and >NA and A is an aliphatic radical; and said lead salt is at least one selected from the group consisting of lead halides, lead naphthanate, lead acetate, lead salts known to react with Grignard reagents, and mixtures thereof.

6. The process of claim 5 further characterized by said organolead compound having three vinylic radicals attached directly to the lead.

7. The process of claim 5 further characterized by said reactant compound being a mixture of compounds represented by the formula RR'C=CHMgX as defined.

8. The process of claim 5 further characterized by said reactant compound being vinyl magnesium chloride.

9. The process of calim 5 further characterized by said hydrocarbon halide being a mixture of compounds represented by the formula R"X' as defined.

10. The process of claim 5 further characterized by said hydrocarbon halide being ethyl chloride.

11. The process of claim 5 further characterized by said cyclic monoether being a mixture of compounds represented by the formula

as defined.

12. The process of claim 5 further characterized by said cyclic monoether being tetrahydrofuran.

13. The process of claim 5 further characterized by said lead salt being lead halide.

14. A process for the production of ethyltrivinyllead which comprises combining in a first step a liquid composition of vinyl magnesium chloride, about 1 mol of ethyl chloride per 3 mols of said vinyl magnesium chloride and at least one mol of tetrahydrofuran per mol of vinyl magnesium chloride to form a product and thereafter reacting the reaction product with lead chloride.

15. A process for the production of an organolead compound having at least one aromatic ring attached directly to the lead and the remaining lead valences satisfied by hydrocarbon radicals comprising, in combination, in a first step combining a liquid composition of a reactant compound, about 1 mol of hydrocarbon halide per 3 mols of said reactant compound and at least 1 mol of cyclic monoether per mol of said reactant compound to form a reaction product and then in a second step reacting said reaction product with a lead salt; said reactant compound being at least one represented by the formula RMgX, where R is an aryl hydrocarbon radical having an aromatic ring attached directly to the magnesium and X is a halogen selected from the group consisting of chlorine, bromine and iodine, said hydrocarbon halide being at least one compound represented by the formula R'X', wherein R' is at least one selected from the group consisting of an alkyl radical having from 1 to 12 carbon atoms and cycloaliphatic radicals and X' is a halogen selected from the group consisting of chlorine, bromine and iodine; said cyclic monoether being at least one ether represented by the formula

wherein $R_1$ is an alkylene radical, $R_2$ is selected from the group consisting of an ethylene radical, an ethylenically unsaturated divalent hydrocarbon radical, >CHA' Z is selected from the group consisting of a methylene radical and >NA and A is an aliphatic radical; said lead salt is at least one selected from the group consisting of lead halides, lead naphthanate, lead acetate, lead salts known to react with Grignard reagents, and mixtures thereof.

16. The process of claim 15 further characterized by said organolead compound having three aromatic rings attached directly to the lead.

17. The process of claim 15 further characterized by said reactant compound being a mixture of compounds represented by the formula RMgX as defined.

18. The process of claim 15 further characterized by said reactant compound being phenyl magnesium chloride.

19. The process of claim 15 further characterized by said hydrocarbon halide being a mixture of compounds represented by the formula R'X' as defined.

20. The process of claim 15 further characterized by said hydrocarbon halide being ethyl chloride.

21. The process of claim 15 further characterized by said hydrocarbon halide being methyl chloride.

22. The process of claim 15 further characterized by said cyclic monoether being a mixture of compounds represented by the formula

as defined.

23. The process of claim 15 further characterized by said cyclic monoether being tetrahydrofuran.

24. The process of claim 15 further characterized by said lead salt being lead halide.

25. A process for the production of ethyltriphenyl lead which comprises combining in a first step a liquid composition of phenyl magnesium chloride, about 1 mole of ethyl chloride per 3 mols of said phenyl magnesium chloride and at least one mol of tetrahydrofuran per mol of phenyl magnesium chloride to form a product and thereafter reacting the reaction product with lead chloride.

26. A process for the production of a tetravalent lead compound having at least one vinylic group attached to the lead which consists essentially of reacting a liquid composition of a vinylic magnesium chloride, lead chloride, an alkyl chloride and a cyclic monoether of the formula

wherein R is an alkylene radical, R' is selected from the group consisting of an ethylene radical, an ethylenically unsaturated divalent hydrocarbon radical, >CHA, and mixtures thereof; Z is selected from the group consisting of a methylene radical, >NA and mixtures thereof and A is an aliphatic radical.

27. The process of claim 26 further characterized by said tetravalent lead compound being alkyltrivinyllead, said vinylic magnesium chloride being vinyl magnesium chloride and the reactants being present in proportions operative to produce an alkyltrivinyllead.

28. The process of claim 26 further charactreized by said cyclic monoether being tetrahydrofuran.

29. The process of claim 26 further characterized by said lead chloride being present in said liquid composition in a quantity sufficient to provide about 1 mol of lead chloride per 3 mols of said vinylic magnesium chloride present.

30. The process of claim 29 further characterized by said alkyl chloride being methyl chloride and said cyclic monoether being tetrahydrofuran.

31. The process of claim 29 further characterized by said alkyl chloride being ethyl chloride and said cyclic monoether being tetrahydrofuran.

References Cited

UNITED STATES PATENTS

| | | | |
|---|---|---|---|
| 1,705,723 | 3/1929 | Daudt | 260—437 |
| 2,535,193 | 12/1950 | Calingaert et al. | 260—437 |
| 2,855,397 | 10/1958 | Ramsden | 260—346.1 XR |
| 2,894,012 | 7/1959 | Ramsden et al. | 260—346.1 XR |
| 2,921,940 | 1/1960 | Ramsden | 260—346.1 XR |
| 2,959,596 | 11/1960 | Ramsden et al. | 260—346.1 XR |
| 2,959,597 | 11/1960 | Ramsden et al. | 260—346.1 XR |
| 2,959,598 | 11/1960 | Ramsden | 260—346.1 |
| 3,071,607 | 1/1963 | Juenge | 260—437 |
| 3,148,959 | 9/1964 | Kautsky et al. | |
| 3,156,716 | 11/1964 | Ramsden et al. | 260—437 |

OTHER REFERENCES

Coates: Organometallic Compounds, John Wiley & Sons, Inc., New York (1960), pp. 201 and 202.

Kharasch et al.: Grignard Reactions of Nonmetallic Substances, Prentice-Hall, Inc., New York (1954), pp. 1067, 1068, 1090, 1091, 1096.

Gilman et al.: Journal of Org. Chem., vol. 17, p. 630 (1952).

Glockling et al.: J. Chem. Soc. (1961), p. 4405.

TOBIAS E. LEVOW, *Primary Examiner.*

H. M. S. SNEED, *Assistant Examiner.*

U.S. Cl. X.R.

252—182, 188, 386; 260—345.1, 346.1, 665